(12) United States Patent
Sasaki et al.

(10) Patent No.: US 7,177,865 B2
(45) Date of Patent: Feb. 13, 2007

(54) DATA SYNCHRONIZATION METHOD AND SYSTEM

(75) Inventors: Takeshi Sasaki, Tokyo (JP); Masato Inoue, Tokyo (JP)

(73) Assignee: Sap AG, Walldorf (DE)

( * ) Notice: Subject to any disclaimer, the term of this patent is extended or adjusted under 35 U.S.C. 154(b) by 446 days.

(21) Appl. No.: 10/608,537

(22) Filed: Jun. 30, 2003

(65) Prior Publication Data

US 2004/0267834 A1    Dec. 30, 2004

(51) Int. Cl.
*G06F 7/00* (2006.01)
(52) U.S. Cl. .......................................................... 707/7
(58) Field of Classification Search .................... 707/7, 707/10, 103 R, 103 Y, 103 X, 103 Z; 709/201–203, 709/217–219
See application file for complete search history.

(56) References Cited

U.S. PATENT DOCUMENTS 5,974,407 A * 10/1999 Sacks ............................ 707/2
2002/0010740 A1 * 1/2002 Kikuchi et al. ............. 709/203
2003/0172092 A1 * 9/2003 Berger et al. ............... 707/203
2004/0030716 A1 * 2/2004 Hoth et al. ............. 707/103 R

* cited by examiner

*Primary Examiner*—Uyen Le
*Assistant Examiner*—Kavita Padmanabhan
(74) *Attorney, Agent, or Firm*—Kenyon & Kenyon LLP

(57) ABSTRACT

A method and system for synchronizing data between a network server and a mobile device is provided. In an embodiment, a plurality of object instances may be received from the network server, and at least one object instance may be selected. For each selected object instance, the plurality of object instances may be recursively searched to identify related object instances, the related object instances may be sorted, and the sorted object instances may be sent to the mobile device, followed by the selected object instance. In this manner, data synchronization between the network server and the mobile device may advantageously include only those object instances that are needed by the mobile device, thereby preventing redundant, or omitted, data transfers.

27 Claims, 8 Drawing Sheets

DATA SYNCHRONIZATION METHOD AND SYSTEM

TECHNICAL FIELD

The present invention relates to a data synchronization method and system. More particularly, the present invention relates to a method and system for synchronizing data between a network server and a mobile device.

BACKGROUND OF THE INVENTION

Enterprise systems manage many of the business processes and applications critical to the success of any particular company, including, for example, order generation and sales activities, inventory management, customer relations and support, product lifecycle and human resources management, etc. Typically, large-scale enterprise systems include one or more enterprise servers and hundreds, if not thousands, of stationary and mobile devices, such as, for example, personal digital assistants (PDAs), pocket computers (Pocket PCs), laptop, notebook and desktop computers, etc. Enterprise systems may also include other components, such as, for example, middleware servers, software application development, deployment and administration subsystems, intra-networks, etc.

Generally, mobile business application functionality may be distributed between an enterprise server and a mobile device based on many different criteria, including, for example, the specific requirements of the particular business application, the processing and storage capacities of the mobile devices, etc. In many cases, business application data may be created, modified and deleted by both the mobile device and the enterprise server. Consequently, maintaining the consistency of business application data between the mobile device and the enterprise server is an important component of the enterprise system. An intermediate subsystem, such as, for example, a middleware server, may assist the data synchronization process.

Enterprise business applications typically store data as objects, records, etc., within an application database on the enterprise server. A much smaller subset of these data objects may be duplicated and stored on the mobile device. However, enterprise business applications also define various dependencies between data objects, and, consequently, may require all of the related data objects to be present on the mobile device.

Unfortunately, in many cases, the requirement to store many related data objects on the mobile device conflicts with the storage or processing capacities of the mobile device, such as, for example, using an excessive amount of memory to store all of the related data objects, consuming an excessive amount of time or bandwidth to download all of the related data objects, etc. Typically, an excessive, and often redundant, amount of related data objects are downloaded to the mobile device, thereby adversely impacting the performance of the mobile device and, generally, of the entire enterprise system. Furthermore, if all of the data objects related to a particular data object are not already present on the mobile device, that particular data object may not be downloaded at all.

SUMMARY OF THE INVENTION

A method and system for synchronizing data between a network server and a mobile device is provided. In an embodiment, a plurality of object instances may be received from the network server, and at least one object instance may be selected. For each selected object instance, the plurality of object instances may be recursively searched to identify related object instances, the related object instances may be sorted, and the sorted object instances may be sent to the mobile device, followed by the selected object instance. In this manner, data synchronization between the network server and the mobile device may advantageously include only those object instances that are needed by the mobile device, thereby preventing redundant, or omitted, data transfers.

DETAILED DESCRIPTION

Figure 1:
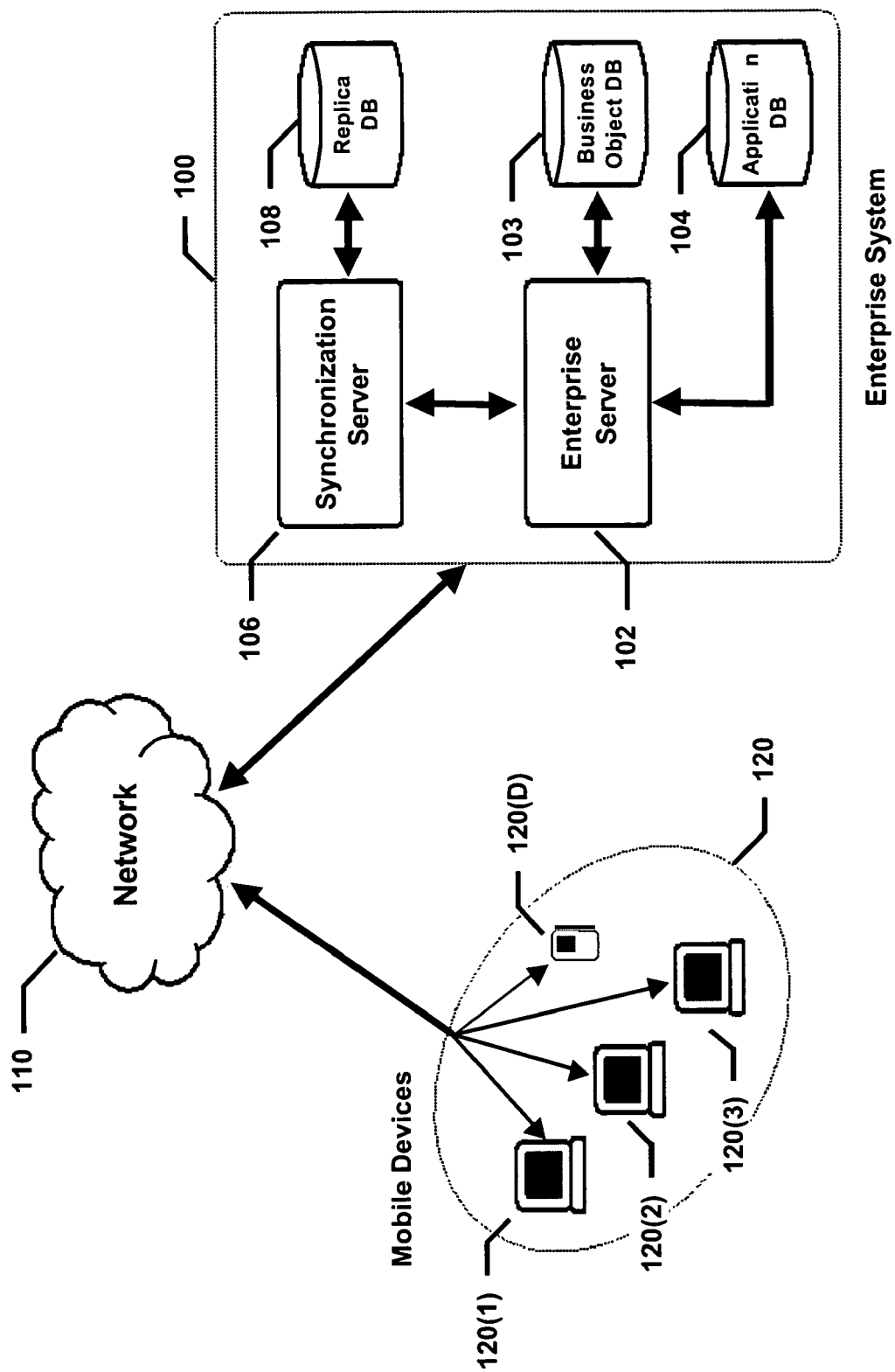
FIG. 1 is a diagram of an enterprise system architecture, according to an embodiment of the present invention.

FIG. 1 is a diagram of an enterprise system architecture, according to an embodiment of the present invention.

Enterprise system 100 may include at least one enterprise server 102 coupled to business object database 103 and application database 104, and at least one synchronization server 106 coupled to at least one replica database 108. Enterprise system 100 may support large scale business applications, involving hundreds, if not thousands, of local and remote users, or clients. Generally, mobile business application functionality may be distributed between enterprise system 100 and plurality of mobile devices 120. Various data acquisition functions, such as, for example, order and invoice generation, service notification, etc., may be performed by mobile device 120(1), mobile device 120(2), etc., while other data management activities, such as product lifecycle management, may be performed by enterprise system 100.

At least a portion of the information created and maintained by enterprise system 100 often needs to be provided to each of the plurality of mobile devices 120 in order to support the mobile business application functionality apportioned to these devices. Similarly, information created or modified by each of the plurality of mobile devices 120 may need to be provided to enterprise system 100. Advanced mobile business applications may employ object oriented approaches to data management, including the use of object classes, object instances, etc.

Various embodiments of the present invention provide a synchronization server (e.g., synchronization server 106) to synchronize object oriented data between enterprise server 102 and plurality of mobile devices 120. For example, synchronization server 106 may receive periodic, or aperiodic, data updates from enterprise server 102. These data updates may include instances of various object classes, several of which may be related to one another. For example, an object instance may include a reference to another object instance, and a hierarchy of object instances may be used by the mobile business application. However, not all these object instances may need to be sent to plurality of mobile devices 120. In one embodiment, an object instance may be selected by synchronization server 106, and the remaining object instances may be recursively searched to identify object instances that may be related to the selected object instance. The related object instances may be sorted and then sent from synchronization server 106 to one, or more, of the plurality of the mobile devices 120. The selected object instance may then be sent from synchronization server 106 to one, or more, the mobile device.

Enterprise server 102 may be a symmetric multiprocessing (SMP) computer, such as, for example, an IBM eServer™ zSeries™ 900, manufactured by International Business Machines Corporation of Armonk, N.Y., a Sun Enterprise™ 10000 server, manufactured by Sun Microsystems of Santa Clara, Calif., etc. Business object database 103 and application database 104 may reside on one or more disks, or disk farms, coupled to enterprise server 102, or, alternatively, to network 110. Synchronization server 106 may also be a symmetric multiprocessing (SMP) computer, similar to enterprise server 102, and replica database 108 may reside on one or more disks, or disk farms, coupled to synchronization server 106, or, alternatively, to network 110. Generally, enterprise system 100 may be coupled to network 110. In one embodiment, synchronization server 106 and enterprise server 102 may be coupled to network 110, while in another embodiment, synchronization server 106 may be coupled to network 110, and enterprise server 102 may be coupled to synchronization server 104 via a virtual private network, a local area network, a wide area network, etc.

Network 110 may include any type or combination of public or private, wired or wireless networks including, for example, a local area network (LAN), a wide area network (WAN), a virtual private network (VPN), the Internet, etc. Various combinations and layers of network protocols may operate over network 110, including, for example, Ethernet (i.e., IEEE 802.3 CSMA/CD Ethernet), Wireless LAN (e.g., IEEE 802.11, IEEE 802.16, ETSI HYPERLAN/2, Bluetooth, General Packet Radio Service or GPRS, etc.), Transmission Control Protocol/Internet Protocol (TCP/IP), Asynchronous Transfer Mode (ATM), etc. Enterprise system 100 may communicate with plurality of mobile devices 120, i.e., mobile device 120(1), 120(2), 120(3) . . . 120(D), via network 110. Various well-known authentication and data encryption techniques may be used to preserve an appropriate level of security in the public network context, including, for example, HTTPS (HyperText Transfer Protocol with Secure Sockets Layer), etc.

Plurality of mobile devices 120 may include, for example, notebook or laptop computers (e.g., IBM Thinkpad® T Series Notebook), pocket computers (e.g., HP iPAQ Pocket PC h5450s manufactured by Hewlett-Packard of Palo Alto Calif.), personal digital assistants or PDAs (e.g., Palm Tungsten™ T Handhelds manufactured by Palm, Inc. of Milpitas Calif.), smart cellular phones, etc. An operating system may also be provided for each mobile device, such as, for example, Palm OS 5, or any one of a number of Microsoft® Windows® operating systems manufactured by Microsoft Corporation of Redmond Washington, including, for example, Windows® 2000, Windows® XP, Windows® XP Embedded, Windows® CE .NET, Windows® Pocket PC 2002, etc. Each of the plurality of mobile devices 120 may also include mobile application software. In an embodiment, mobile application software may include various functional layers, such as, for example, a user interface layer (UIL) or presentation layer, a business object layer (BOL), a business document layer (BDL) or transaction layer (TL), etc.

In addition to the operating system, each of the plurality of mobile devices 120 may include other software components to support mobile application software, such as, for example, a browser (e.g., Microsoft® Internet Explorer, etc.), microbrowser or native user interface, a web server, a servlet engine, runtime interpreters, extended Markup Language (XML) parsers, data exchange interfaces (e.g., Simple Object Access Protocol, or SOAP, interface, etc.), authentication and encryption components, hardware device drivers, etc. In an embodiment, one, or more, of these runtime components may facilitate data acquisition, transfer and management between the mobile device and enterprise system 100. For example, a Runtime Framework (RF) may include several software components to provide various enterprise-related services to the mobile software application. These components may be accessed, for example, through an Application Programming Interface (API) associated with the Runtime Framework.

In one embodiment, the Runtime Framework may include various Java-based technologies, such as, for example, Java™ Virtual Machine (JVM), Java™ Server Pages (JSP), Java™ 2 Platform, Micro Edition (J2ME™), etc. In another embodiment, the Runtime Framework may include other mobile or embedded technologies, such as, for example, Microsoft®.NET technologies, Microsoft® eMbedded Visual Basic®, Microsoft® eMbedded Visual C++®, etc. Generally, mobile application software may be organized as runtime objects (ROs) representing executable code embodying various physical and logical constructs, such as, for example, data structures, function calls, procedures, object-oriented classes, etc. Executable code may reside on the mobile device in various forms, such as, for example, HTML files, Dynamic Link Libraries (DLLs), Visual Basic Application (VBA) files, etc. Each of the plurality of mobile devices 120 may include memory to store these runtime objects, as well as memory to store a local database, which may include data associated with the mobile application software.

Each of the plurality of mobile devices 120 may include a network interface to connect to network 110, such as, for example, a coaxial cable interface, a fiber-optic interface, a wireless network interface, etc. Plurality of mobile devices 120 may support an on-line operating mode when connected to network 110, and an off-line operating mode when not connected to network 110. Data integrity, consistency and security may be provided, generally, by complementary synchronization processes executing on enterprise system 100 and each of the plurality of mobile devices 120.

In one embodiment, the enterprise synchronization process may be performed by enterprise server 100, while in another embodiment, and as noted above, synchronization server 106 may provide the enterprise synchronization process. In one embodiment, the mobile synchronization process may be included within the Runtime Framework, while in another embodiment, the mobile synchronization process may be an additional component executing on each mobile device. For example, the mobile synchronization process may include Sun JDBC™ technology and employ HTTPS over the network interface.

Figure 2:
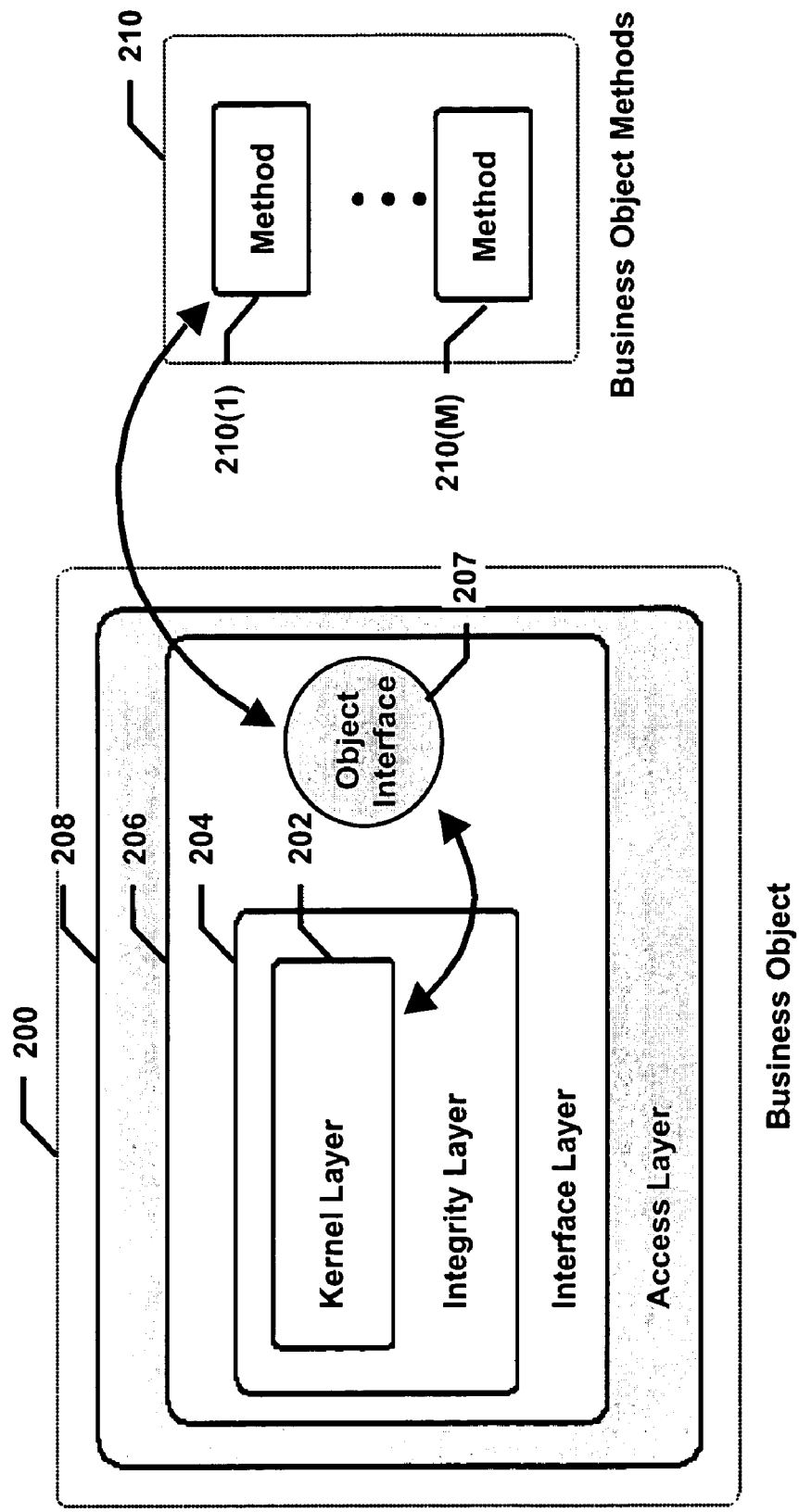
FIG. 2 is a detailed diagram illustrating a business object and associated business object interface, according to an embodiment of the present invention.

FIG. 2 is a detailed diagram illustrating a business object, according to an embodiment of the present invention.

Enterprise system 100, as well as plurality of mobile devices 120, may include software components expressing the functionality and dependencies of various business processes and data, typically architected according to well-known object-oriented programming (OOP) methods and constructs. Generally, these software components may include application programs and databases, interface libraries, etc., developed, in many cases, using object-oriented software development tools, such as, for example, SAP Software Development Kit (SDK Version 6.2, manufactured by SAP AG of Walldorf, Germany), etc.

In an embodiment, enterprise server 102 may include a plurality of business objects which encapsulate various business methods and data specific to enterprise system 100, while hiding structure and implementation details from higher-level software components, such as, for example, business applications. Generally, business objects may include data definitions, methods, operational rules and constraints, access specifications, etc., that are particular to a specific business component, process, logical construct, etc. Various interfaces may be defined to provide access to the methods and data associated with a particular business object, such as, for example, business application programming interfaces, or "BAPIs".

Each business object may be created as an instance of a business object type. For example, each employee of a company may be represented by an instance of an Employee business object type. Business object types may be stored within a business object repository (BOR), such as, for example, business object database 103, etc., while business objects (also known as business object instances, object instances, etc.) may be stored within a different database, such as, for example, application database 104, etc. In an embodiment, business object 200 may include kernel layer 202, integrity layer 204, interface layer 206 and access layer 208.

Kernel layer 202 may include data inherently associated with business object 200. For example, an employee business object may include data representing an employee identification number, name, supervisor, business division, etc. Integrity layer 204 may include rules and constraints associated with the environment. Interface layer 206 may describe the implementation and structure of the various methods associated with business object 200, and may include one or more associated interfaces, such as, for example, business object interface 207. Access layer 208 may define various technologies that may be used to access business object 200, such as, for example, COM/DCOM (component object model/distributed component object model), RFC (remote function call), JAVA, CORBA (common object request broker architecture), etc.

In an embodiment, plurality of business object methods 210, i.e., business object method 210(1) . . . 210(M), etc., may also provide access to, or operate upon, data defined within kernel layer 202 of business object 200. In this embodiment, plurality of business object methods 210 may be constructed as function modules compatible with the Remote Function Call (RFC) protocol. Each function module may also be associated with a corresponding business object interface, such as, for example, business object interface 207. Plurality of business object methods 210 may be stored within a business object repository, such as, for example, business object database 103, etc., or, alternatively, plurality of business object methods 210 may be stored within a different database, memory, etc.

Figure 3A:
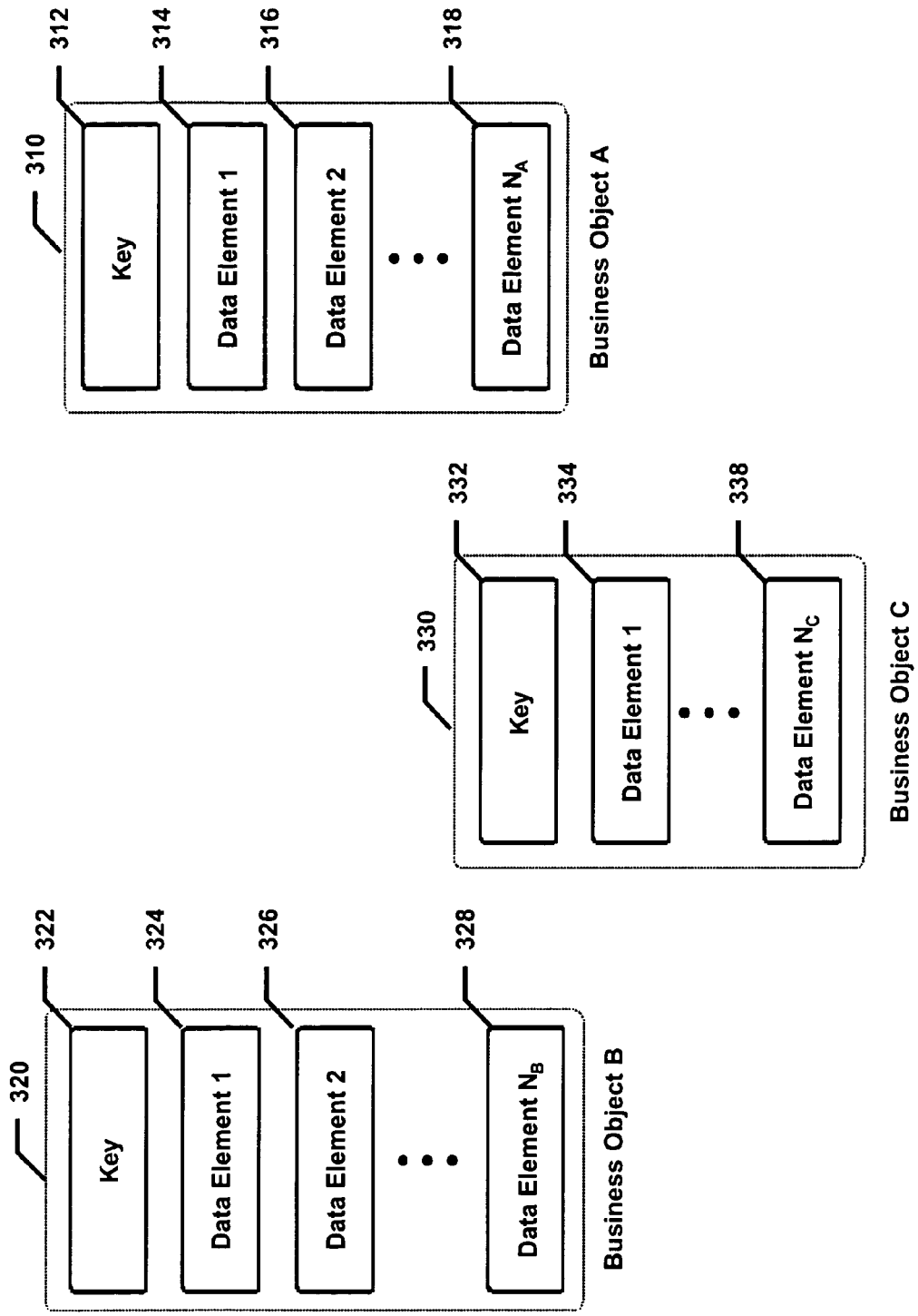
FIG. 3A is a detailed diagram illustrating several business objects, according to an embodiment of the present invention.

FIG. 3A is a detailed diagram illustrating several business objects, according to an embodiment of the present invention.

As discussed above, the functionality of a mobile business application may be apportioned between enterprise server 102 and plurality of mobile devices 120, and may, generally, consist of various methods and processes operating on business application data. These data may be shared between enterprise server 102 and plurality of mobile devices 120. For example, a sales application may include one or more processes executing on enterprise server 102, as well as one or more processes executing on plurality of mobile devices 120. Enterprise server 102 may create, modify and store large volumes of business application data within application database 104, such as, for example, sales orders, customer information, etc., while each of the plurality of mobile devices 120 may create, modify and store a much smaller volume of these data locally, including, for example, sales orders.

In an embodiment, the mobile business application may operate upon business application data defined by various business object types, such as, for example, business object type A, business object type B, business object type C, etc. As discussed above, each business object type may express data associated with a physical or logical construct related to a particular business process, such as, for example, sales orders, customers, etc., while each business object may define a specific instance of a particular business object type, such as, for example, a single sales order, a single customer, etc. In one embodiment, each business object may include a plurality of data fields, while in another embodiment, each business object may include at least one key as well as several data elements 1. . . N. The key may facilitate identification of each specific instance of a particular business object type. As discussed above with reference to FIG. 2, these data may be accessed through business application programming interfaces, or BAPIs. Alternatively, these data may be accessed through business application programming interface wrappers, or BAPI Wrappers, which may add additional rules and functionality to business application programming interfaces.

In one example, a mobile business application may employ three business objects to store business application data shared between enterprise server 102 and plurality of mobile devices 120. Referring to FIG. 3A, business object 310 may be defined by business object type A, and may include key 312 as well as data elements 314, 316 . . . 318. Business object 320 may be defined by business object type B, and may include key 322 as well as data elements 324, 326 . . . 328. Business object 330 may be defined by business object type C, and may include key 332 as well as data elements 334, 336 . . . 338. In a simple embodiment, enterprise server 102 and plurality of mobile devices 120 may each store a copy of these business objects. Modifications to business objects 310, 320 and 330 may be performed by enterprise server 102, as well as by any of the plurality of mobile devices 120, and may be propagated throughout the system by synchronization server 106.

In one embodiment, synchronization server 106 may periodically request all of the data within business objects 310, 320 and 330 from enterprise server 102, compare these data with the contents of replica database 108, and update replica database 108 with those data that have been modified by enterprise server 102. In another embodiment, synchronization server 106 may periodically request only those data within business objects 310, 320 and 330 that have been modified by enterprise server 102, then update replica database 108 with the modified data. In response to individual requests received from each of the plurality of mobile devices 120, synchronization server 106 may send the modified data to each mobile device.

Similarly, plurality of mobile devices 120 may individually upload modifications to business objects 310, 320 and 330 to synchronization server 106. Synchronization server 106 may update replica database 108 with the modified data, and then send these modified data to enterprise server 102. Modifications performed simultaneously by enterprise server 102 and one or more mobile devices 120(1), 120(2), etc., may be identified by synchronization server 106, and any contentions may be resolved according to any number of rules, such as, for example, choosing enterprise server 102 data, choosing mobile device data, choosing the most recent data, etc.

Figure 3B:
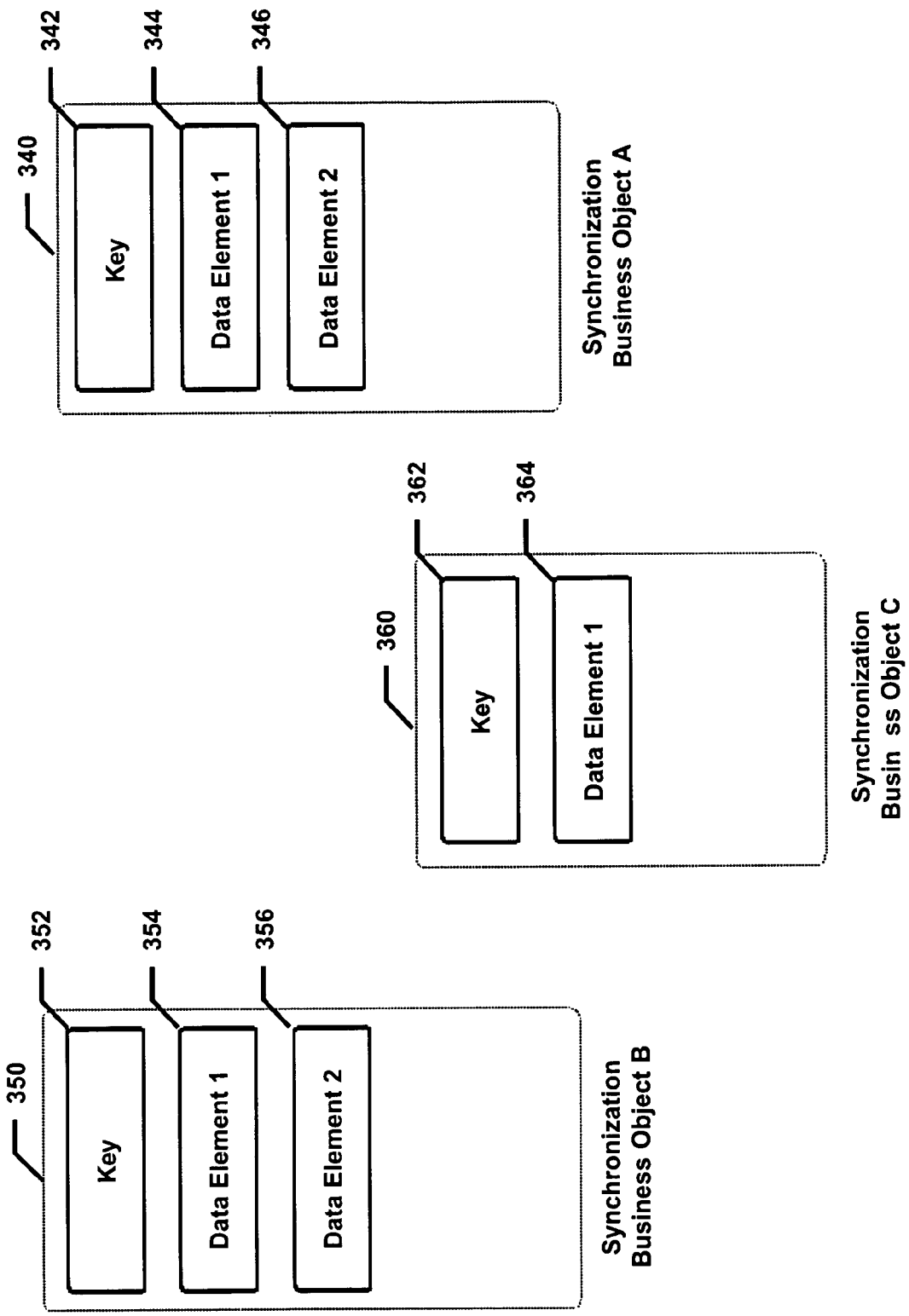
FIG. 3B is a detailed diagram illustrating several synchronization business objects, according to an embodiment of the present invention.

FIG. 3B is a detailed diagram illustrating several synchronization business objects, according to an embodiment of the present invention.

In an embodiment, enterprise server 102 may operate upon business application data defined by various business object types, while plurality of mobile devices 120 may operate upon business application data defined by various synchronization business object types. Generally, synchronization business object types may define data shared between enterprise server 102 and plurality of mobile devices 120, and each synchronization business object type may include one or more data fields, keys, data elements, etc., corresponding to one or more business object types. Additionally, various methods may be provided to access the data within each synchronization business object type. Each synchronization business object may be created as an instance of a synchronization business object type, similar to business object instances.

In one embodiment, synchronization business object types may be created by an object-oriented software development tool, such as, for example, SAP's Software Development Kit. Using a synchronization business object builder tool (e.g., SAP's SyncBO Builder), a developer may create synchronization business object types based on one or more business object type definitions. In one embodiment, the synchronization business object builder may allow the developer to select various fields from one, or more, business object type definitions, and then automatically generate a synchronization business object type, which may include data structure definitions as well as data access methods. Data access methods may include, for example, replicating an instance of the synchronization business object type from enterprise server 102 to synchronization server 106, downloading an instance of the synchronization business object type from synchronization server 106 to one of the plurality of mobile devices 120, uploading an instance of the synchronization business object type from one of the plurality of mobile devices 120 to synchronization server 106, etc.

In an example, a mobile business application may employ three synchronization business objects to store business application data shared between enterprise server 102 and plurality of mobile devices 120. Synchronization business object type A may include a subset of the data fields within business object type A, such as, for example, a key and two data elements, as well as methods associated with accessing these data. Similarly, synchronization business object type B may include a subset of the data fields within business object type B, as well as methods associated with accessing these data. Similarly, synchronization business object type C may include a subset of the data fields within business object type C, as well as methods associated with accessing these data. In another embodiment, synchronization business object types may include data fields from more than one business object type.

Referring to FIG. 3B, synchronization business object 340 may be defined by synchronization business object type A, and may include key 342 as well as data elements 344 and 346. In this example, key 342, data elements 344 and 346 may correspond to key 312, data elements 314 and 316 of business object 310, respectively. Synchronization business object 350 may be defined by synchronization business object type B, and may include key 352 as well as data elements 354 and 356, corresponding to key 322, data elements 324 and 326, respectively, of business object 320. Synchronization business object 360 may be defined by synchronization business object type C, and may include key 362 as well as data element 364, corresponding to key 332 and data element 334, respectively, of business object 330. Methods associated with these synchronization business object types are not shown for clarity.

In an embodiment, synchronization server 106 and plurality of mobile devices 120 may each store a copy of these synchronization business objects, while enterprise server 102 may store the corresponding business objects. Modifications to synchronization business objects 340, 350 and 360 may be performed by any of the plurality of mobile devices 120, while modifications to business objects 310, 320 and 330 may be performed by enterprise server 102. These modifications may be propagated throughout the system by synchronization server 106. For example, enterprise server 102 may modify data element 314, and, in response to a request, send the modification to synchronization server 106. Synchronization server 106 then updates data element 344 within replica database 108, and, in response to a request from one, or more, of the plurality of mobile devices 120, sends updated data element 344 to the mobile device. Similarly, mobile device 120(1) may modify data element 344, and upload the modification to synchronization server 106. Synchronization server 106 may update data element 344 stored within replica database 108, and then send the modification to enterprise server 102, which updates data element 314 within application database 104.

Figure 3C:
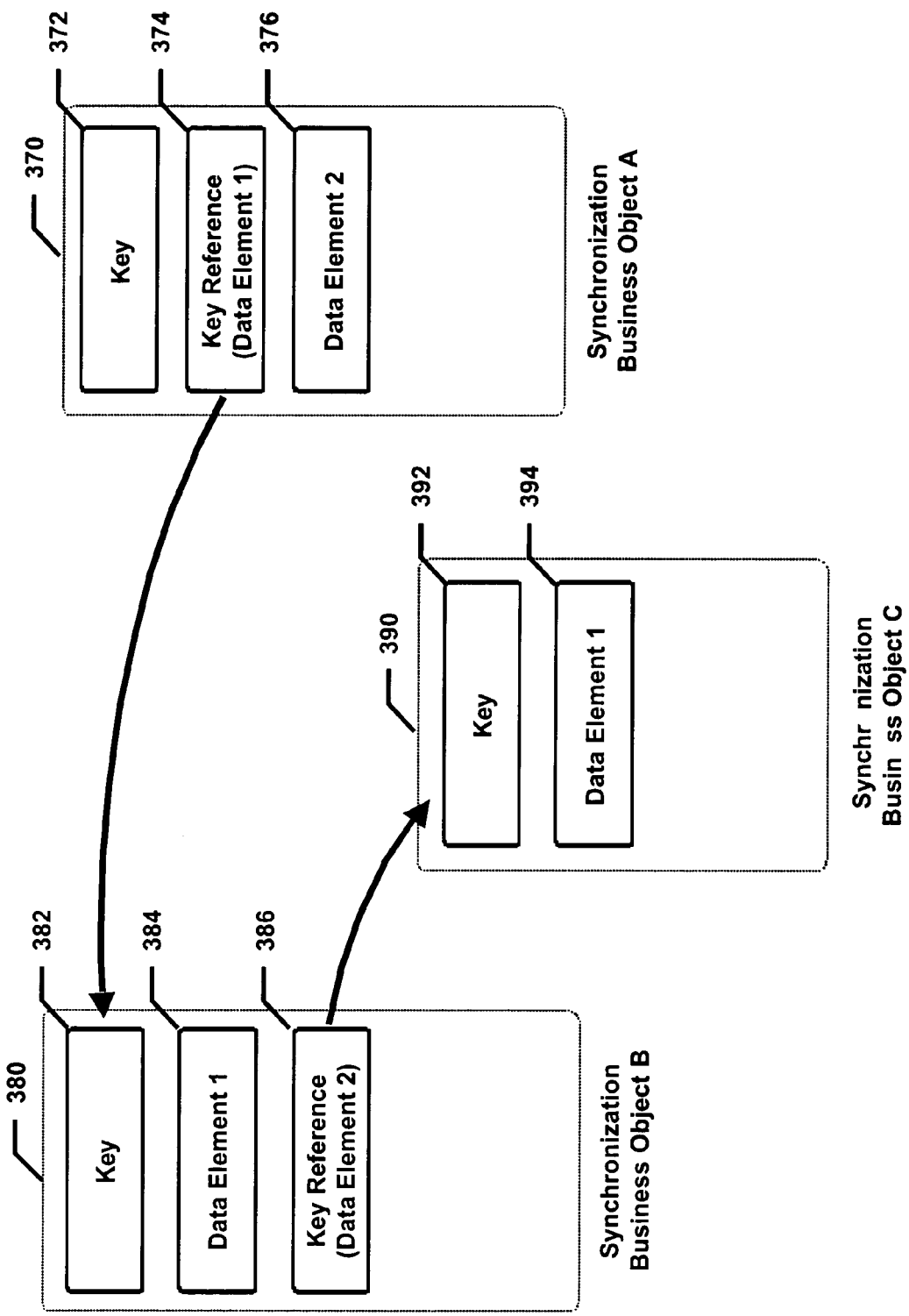
FIG. 3C is a detailed diagram illustrating several related synchronization business objects, according to an embodiment of the present invention.

FIG. 3C is a detailed diagram illustrating several related synchronization business objects, according to an embodiment of the present invention.

In an embodiment, a synchronization business object type may include a data element that references a key to a different synchronization business object type. In this manner, an instance of a synchronization business object type may refer to an instance of a related synchronization business object type. For example, synchronization business object type A may include a subset of the data fields within business object type A, such as, for example, a key and two data elements. The first data element may refer to the key of a second synchronization business object type B. Similarly, synchronization business object type B may include a subset of the data fields within business object type B, such as, for example, a key and two data elements. The second data element may refer to the key of a third synchronization business object type C, which may include a subset of the data fields within business object type C.

In other embodiments, synchronization business object types may include data fields from more than one business object type, as well as key references to more than one related synchronization business object type.

Referring to FIG. 3C, synchronization business object 370 may be defined by synchronization business object type A, and may include key 372 as well as data elements 374 and 376. In this example, key 372 and data element 376 may correspond to key 312 and data element 316 of business object 310, respectively, while data element 374 may reference key 382 of synchronization business object 380. Similarly, synchronization business object 380 may be defined by synchronization business object type B, and may include key 382 as well as data elements 384 and 386. In this example, key 382 and data element 384 may correspond to key 322 and data element 324 of business object 320, respectively, while data element 386 may reference key 392 of synchronization business object 390. Synchronization business object 390 may be defined by synchronization business object type C, and may include key 392 as well as data element 394, corresponding to key 332 and data element 334, respectively, of business object 330.

In this example, synchronization business object type C may include a subset of the data within business object type C, synchronization business object type B may include a subset of the data within business object type B, and synchronization business object type A may include a subset of the data within business object type A. Additionally, synchronization business object type C may be related to synchronization business object type B, and synchronization business object type B may be related to synchronization business object type A. Synchronization business object type C may define country data, synchronization business object type B may define customer data, and synchronization business object type A may define sales order data. Synchronization business object 390 may represent data associated with a single country: key 392 may be a country identifier (e.g., "US"), while data element 394 may be a country name (e.g., "United States"). Synchronization business object 380 may represent data associated with a single customer: key 382 may be a customer identifier (e.g., "101"), data element 384 may be a customer name (e.g., "Brawn"), while data element 386 may reference key 392 (e.g., "US"). Synchronization business object 370 may represent data associated with a single sales order: key 372 may be a sales order identifier (e.g., "5001"), data element 374 may reference key 382 (e.g., "101"), while data element 376 may be a delivery date (e.g., "2003 Apr. 23").

Figure 4:
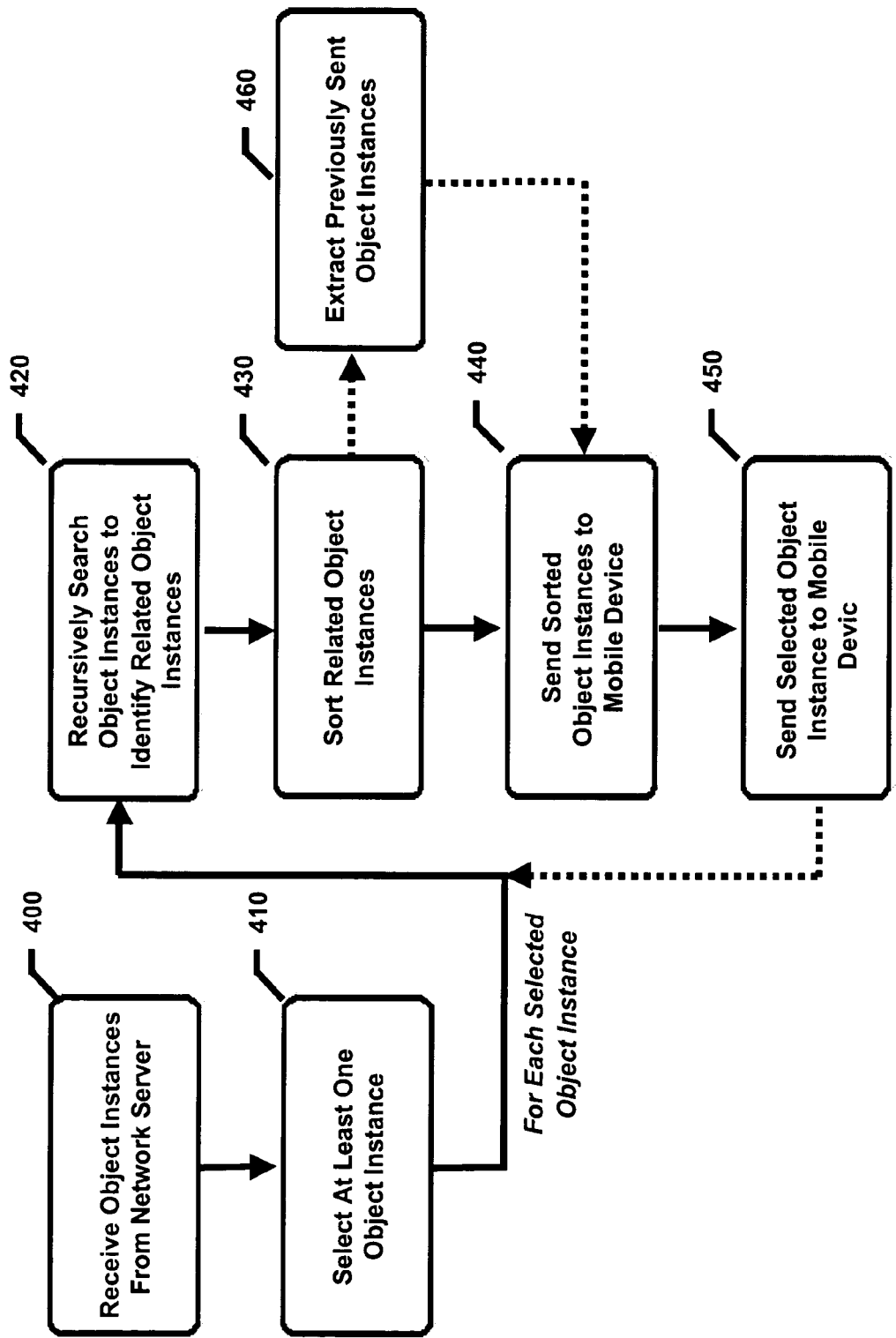
FIG. 4 is a top level flow diagram illustrating a method for synchronizing data between a network server and a mobile device, according to an embodiment of the present invention.

FIG. 4 is a top level flow diagram illustrating a method for synchronizing data between a network server and a mobile device, according to an embodiment of the present invention. The following discussion also references FIG. 5, which presents a diagram illustrating several related synchronization business object instances, according to an embodiment of the present invention.

A plurality of object instances may be received (400) from a network server. In an embodiment, synchronization server 106 may receive (400) plurality of object instances 500 from enterprise server 102. Generally, plurality of object instances 500 may be stored within replica database 108, and, as discussed above, synchronization server 106 may receive periodic updates (e.g., additions, deletions, modifications, etc.) to these object instances. In one embodiment, all of the object instances within plurality of object instances 500 may be received (400) from enterprise server 102, while in another embodiment, only those object instances that have been modified, added, deleted, etc., since the last update may be received (400) from enterprise server 102. In a further embodiment, only those data elements within each of the plurality of object instances 500 that have been modified may be received (400) from enterprise server 102.

In an embodiment, plurality of object instances 500 may include more than one type of synchronization business object. For example, plurality of object instances 500 may include various object instances associated with Country synchronization business object type 510 (e.g., object instances 512, 514, 516 and 518), Customer synchronization business object type 520 (e.g., object instances 522, 524 and 526), Sales Order synchronization business object type 530 (e.g., object instances 532, 534 and 536), etc. Generally, as discussed with reference to FIG. 3C, synchronization business object types may be related to one another. In an embodiment, one synchronization business object type may include a data element that references a different synchronization business object type.

In one example, Sales Order synchronization business object type 530 may include a "Customer ID" data element that may reference a "Customer ID" key within Customer synchronization business object type 520, as indicated by connecting arrow 550. Consequently, each Sales Order object instance includes a data element value (i.e., "Customer ID" value) that identifies a related Customer object instance. Object instance 532, for example, includes a Customer ID value equal to "101," which identifies object instance 522. Similarly, object instance 534 includes a Customer ID value equal to "102," which identifies object instance 524, object instance 536 includes a Customer ID value equal to "103," which identifies object instance 526, etc.

In another example, Customer synchronization business object type 520 may include a "Country ID" data element that may reference the "Country ID" key within Country synchronization business object type 510, as indicated by connecting arrow 552. Consequently, each Customer object instance includes a data element value (i.e., "Country ID" value) that identifies a related Country object instance. Object instance 522, for example, includes a Country ID value equal to "US," which identifies object instance 512. Similarly, object instance 524 includes a Country ID value equal to "US," which also identifies object instance 512, object instance 526 includes a Country ID value equal to "JP," which identifies object instance 514, etc. In this example, none of the Customer object instances include a Country ID values equal to "DE" or "GB," consequently, none of the Customer object instances reference object instances 516 or 518. Expressed differently, object instances 516 and 518 may not be related to any Customer object instances.

Accordingly, a hierarchy of object instances may be created based on these relationships. Generally, with respect to the embodiment depicted in FIG. 5, each Country object instance may be referenced by one, or more, Customer object instances, while each Customer object instance may be referenced by one, or more, Sales Order object instances. For example, object instance 522 may be referenced by object instance 532 (e.g., via Customer ID value "101"), while object instance 512 may be referenced by object instance 522 (e.g., via Country ID value "US"). Consequently, object instance 532 may be directly related to object instance 522 according to a first-tier relationship, and indirectly related to object instance 512 according to a second-tier relationship. Similarly, object instance 522 may be directly related to object instance 512. In other words, any particular object instance may be related to one, or more, different object instances according to a hierarchical relationship (e.g., first-tier, second-tier, etc.).

At least one object instance may be selected (410) from the plurality of object instances. In a simple embodiment, all of the plurality of object instances 500 may be selected (410) and then sent (450) to the mobile device. In a more sophisticated embodiment, at least one object instance may be selected (410) from plurality of object instances 500. Many selection criteria may be applied to plurality of object instances 500, such as, for example, object type, object instance data element value, etc.

In an embodiment, at least one object instance may be selected (410) from plurality of object instances 500 based on at least one filtering criteria. For example, all Sales Order synchronization business object instances may be selected (410), i.e., object instances 532, 534 and 536. In another example, all Sales Order synchronization business object instances having a delivery date of "Apr. 23, 2003" may be selected (410), i.e., object instances 532 and 534. Combinations of filtering criteria may also be used, such as, for example, Sales Order synchronization business object instances having a delivery date of "Apr. 23, 2003" (i.e., object instances 532 and 534), combined with Customer synchronization business object instances including a Country ID equal to "US" (i.e., object instances 522 and 524).

For each selected object instance, the plurality of object instances may be recursively searched (420) to identify related object instances, the related object instances may be sorted (430), the sorted object instances may be sent (440) to the mobile device and then the selected object instance may be sent (450) to the mobile device. Each of these processes will be described below with reference to the selection of Sales Order synchronization business object instances having a delivery date equal to "Apr. 23, 2003" (object instances 532 and 534), as described above. Consequently, for the purposes of the following discussion, object instance 532 may be selected (410) first, while object instance 534 may be selected (410) second.

The plurality of object instances may be recursively searched (420) to identify related object instances. In an embodiment, the Sales Order synchronization business object type may include a "Customer ID" data element that may reference the "Customer ID" key of the Customer synchronization business object type. Similarly, the Customer synchronization business object type may include a "Country ID" data element, which may reference the Country synchronization business object type via the "Country ID" key. Consequently, for the first selected object instance, i.e., object instance 532, all of the object instances associated with the Customer synchronization business object type, i.e., object instances 522, 524 and 526, may be searched to identify the object instance having a Customer ID value equal to "101," i.e., object instance 522. Next, all of the object instances associated with the Country synchronization business object type, i.e., object instances 512, 514, 516 and 518, may be searched to identify the object instance having a Country ID value equal to "US," i.e., object instances 512. Thus, a first-tier relationship between object instance 522 and object instance 532 may be identified, while a second-tier relationship between object instance 512 and object instance 532 may also be identified. Generally, object instances may be recursively searched (420) as required by the relationships defined between the various synchronization business object types.

The related object instances may be sorted (430). In an embodiment, related object instances, identified through the recursive search, may be sorted (430) according to the level of relationship to the selected object instance, in descending order, ascending order, etc. For example, related object instances 512 and 522 may be sorted in descending order, so that the object instance having the furthest relation to selected object instance 532, i.e., object instance 512, may be placed first in the sort order, while the object instance having the closest relation to selected object instance 532, i.e., object instance 522, may be placed second in the sort order, etc. In this manner, the sort order may advantageously reflect the hierarchical relationship between related object instances. In one embodiment, copies of the related object instance may be sorted, while in another embodiment, pointers to the memory locations of each related object instance may be sorted. Various well-known data sorting methods and techniques may also be employed.

The sorted object instances may be sent (440) to the mobile device. In an embodiment, the first object instance in the sort order, i.e., e.g., the object instance having the furthest relation to the selected object instance, may be sent (440) to the mobile device, and the remaining related object instances may be sent (440), in order, thereafter. For selected object instance 532, related object instance 512 may be sent (440) first to the mobile device, while related object instance 522 may be sent (440) second. Advantageously, any particular object instance that includes a reference to another object instance will be sent (440) after the referenced object instance.

The selected object instance may be sent (450) to the mobile device. In an embodiment, after the sorted object instances are sent (440) to the mobile device, the selected object instance may be sent (450). For example, related object instance 512 may be sent (440) first, related object instance 522 may be sent (440) next, and then selected object instance 532 may be sent (450) last. Advantageously, each referenced object instance may be sent (440) to the mobile device in advance of the referring object instance, thereby avoiding many problems associated with missing, or unresolvable, references within object instances after they are sent (440, 450) to the mobile device (e.g., uninitialized pointers, etc.).

Similarly, for selected object instance 534, the plurality of object instances may be recursively searched (420) to identify related object instances. For example, all of the object instances associated with the Customer synchronization business object type, i.e., object instances 522, 524 and 526, may be searched to identify the object instance having a Customer ID value equal to "102," i.e., object instance 524. Next, all of the object instances associated with the Country synchronization business object type, i.e., object instances 512, 514, 516 and 518, may be searched to identify the object instance having a Country ID value equal to "US," i.e., object instance 512. Thus, a first-tier relationship between object instance 524 and object instance 534 may be identified, while a second-tier relationship between object instance 512 and object instance 534 may also be identified.

Likewise, for selected object instance 534, the related object instances may be sorted (430), the sorted object instances may be sent (440) to the mobile device, and then the selected object instance may be sent (450) to the mobile device. For example, related object instances 512 and 524 may be sorted in descending order, so that the object instance having the furthest relation to selected object instance 534, i.e., object instance 512, may be placed first in the sort order, while the object instance having the closest relation to selected object instance 534, i.e., object instance 524, may be placed last in the sort order. Related object instance 512 may then be sent (440) first to the mobile device, and related object instance 524 may be sent (440) next. Finally, selected object instance 534 may be sent (450) to the mobile device.

In an embodiment, object instances previously sent (440, 450) to the mobile device may be extracted (460) from the sorted object instances associated with the currently-selected object instance. In the above examples, object instances 512 and 522 were identified as being related to selected object instance 532, sorted (430), and then sent (440) to the mobile device. Object instances 512 and 524 were subsequently identified as being related to selected object instance 534, and then sorted (430). However, in this embodiment, object instance 512 may be extracted (460) from the sorted object instances associated with selected object instance 534 because object instance 512 was already sent (440) to the mobile device. Consequently, in this example, only related object instance 524 needs to be sent (440) to the mobile device. Similarly, related object instances may be determined to have been sent (450) to the mobile device as previously-selected object instances. Generally, the selected object instance, or any of the related object instances, may have been previously sent (440, 450) to the mobile device as either a selected object instance or a related object instance.

Figure 5:
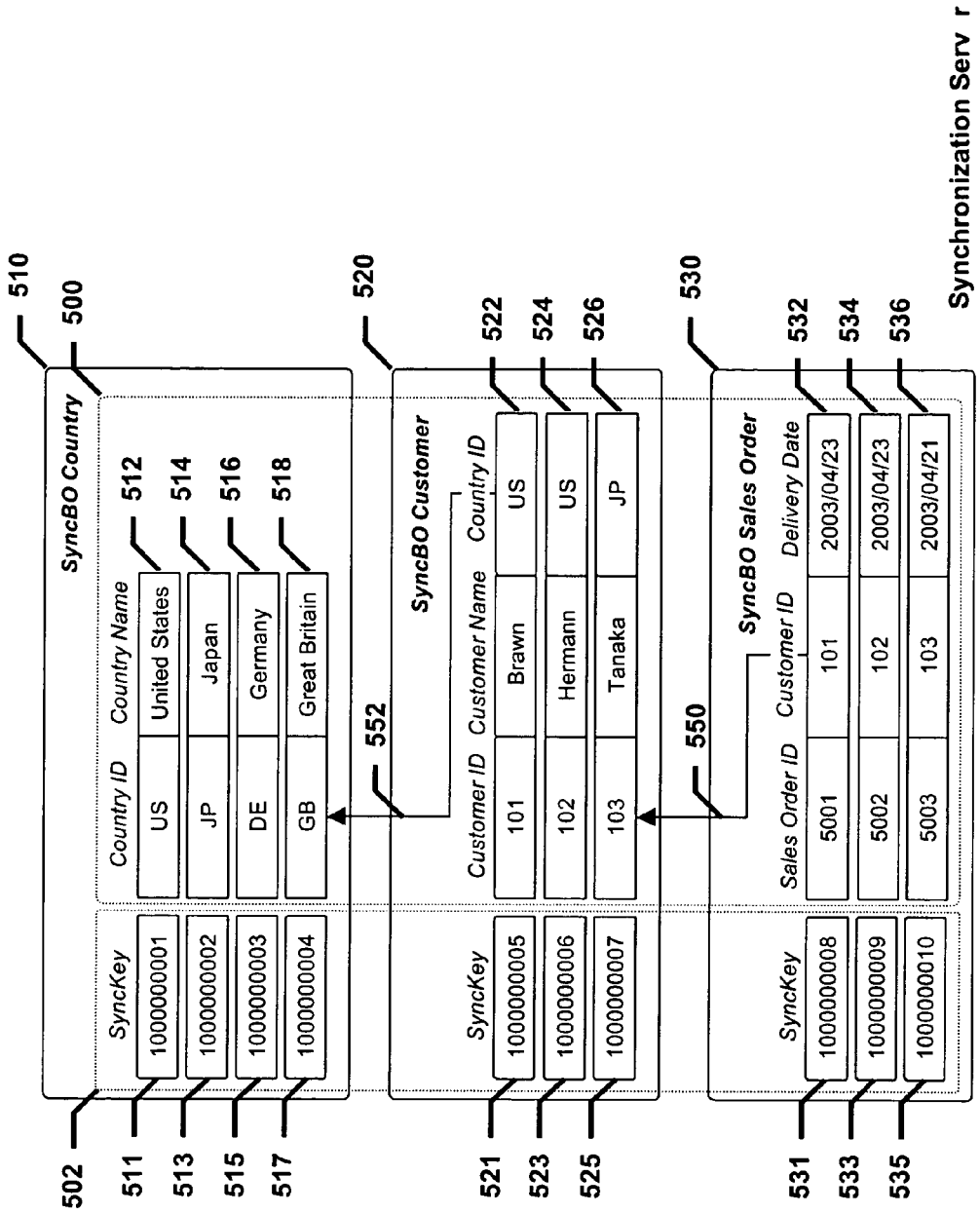
FIG. 5 is a detailed diagram illustrating several synchronization business object instances, according to an embodiment of the present invention.

Consequently, the amount of information sent to the mobile device may be significantly reduced. For example, in the simple embodiment, all 10 object instances depicted within FIG. 5 are selected (410) and then sent (450) to the mobile device, while in more sophisticated embodiments and examples, as little as five (5) object instances need to be sent (440, 450) to the mobile device.

In another embodiment, a unique synchronization key may be associated with each of the plurality of object instances 500 to uniquely identify each object instance. Plurality of synchronization keys 502 may include, for example, synchronization keys 511, 513, 515, 517, 521, 523, 525, 531, 533, 535, corresponding to object instances 512, 514, 516, 518, 522, 524, 526, 532, 534 and 536, respectively. More specifically, synchronization key 511 ("1000000001") may be associated with object instance 512, synchronization key 513 ("1000000002") may be associated with object instance 514, etc. In one embodiment, plurality of synchronization keys 502 may be assigned to plurality of object instances 500 in a sequential manner, while in another embodiment, plurality of synchronization keys 502 may be assigned to plurality of object instances 500 according to various criteria, such as, for example, assigning a series of numbers to each synchronization business object type, etc. Other synchronization key mapping algorithms are contemplated by the present invention.

Figure 6:
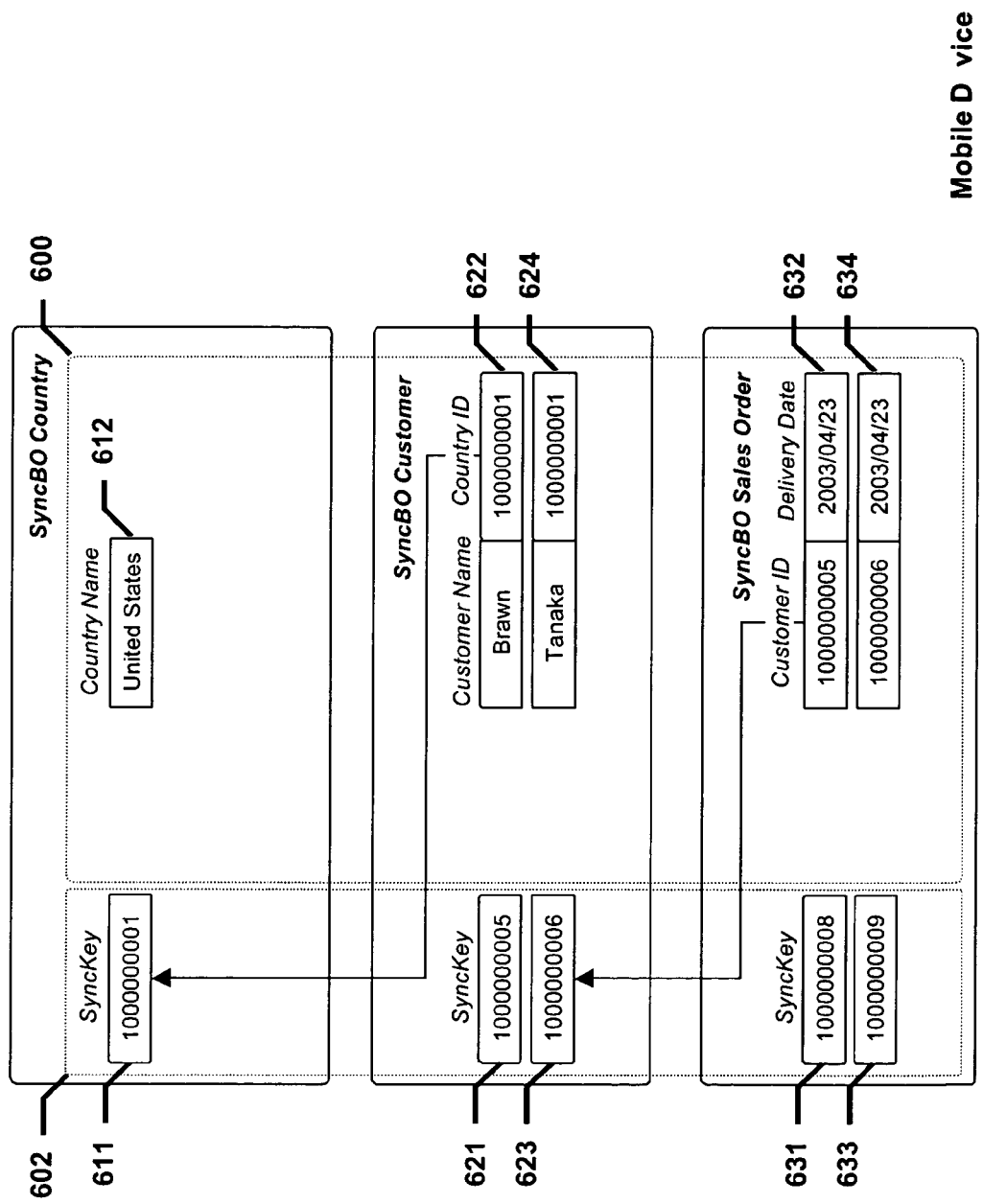
FIG. 6 is a detailed diagram illustrating several synchronization business object instances, according to an embodiment of the present invention.

FIG. 6 is a detailed diagram illustrating several synchronization business object instances, according to an embodiment of the present invention.

In a further embodiment, copies of the related object instances may be sorted (430), and each key referring to a related object instance may be replaced by the synchronization key associated with the related object instance. The key within each related object instance may be deleted, ignored, etc. Similarly, the selected object instance may be copied and any keys referring to related object instances may be replaced by synchronization keys associated with the related object instances. The key within the selected object instance may be deleted, ignored, etc., as well. As discussed above with reference to FIG. 5, Sales Order object type 530 may include a "Customer ID" data element, which may contain a key referring to the "Customer ID" key of Customer object type 520, as indicated by arrow 550.

In a specific example, object instance 532 may include a Customer ID value equal to "101," which may refer to object instance 522, whose Customer ID key equals "101." With reference to FIG. 6, and after synchronization key replacement, object instance 632 may now include a Customer ID value equal to "1000000005," which may refer to object instance 622, whose associated synchronization key 621 equals "1000000005." The Sales Order key, depicted within object instance 532 (FIG. 5), may now be deleted, ignored, etc., as depicted by object instance 632 (FIG. 6).

Within the context of the examples described above, object instances 612 and 622 may be related to the first selected object instance 632, while object instances 612 and 624 may be related to second selected object instance 634. Plurality of object instances 600 may therefore include object instances 612, 622, 624, 632 and 634, while plurality of synchronization keys 602 may include synchronization keys 611, 621, 623, 631 and 633 associated with object instances 612, 622, 624, 632 and 634, respectively. Consequently, synchronization keys, rather than keys, may be sent (440, 450) to the mobile device. Accordingly, plurality of object instances 600 (without keys) and plurality of synchronization keys 602 may represent those data ultimately sent (440, 450) to the mobile device. In an alternative embodiment, the keys within the selected and related object instances may be retained therein and sent (440, 450) to the mobile device.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for synchronizing data between a network server and a mobile device, comprising:
   receiving a plurality of object instances from the network server;
   selecting at least one object instance from the plurality of object instances; and
   for each selected object instance:
   recursively searching the plurality of object instances to identify related object instances,
   sorting the related object instances,
   sending the sorted object instances to the mobile device, and
   sending the selected object instance to the mobile device,
   wherein said sending the sorted object instances is performed prior to said sending the selected object instance.

2. The method of claim 1, wherein each of the plurality of object instances has a key and a plurality of data elements.

3. The method of claim 2, wherein said selecting includes filtering the plurality of object instances based on at least one data element.

4. The method of claim 2, wherein said sorting is based on a hierarchical relationship to the selected object instance.

5. The method of claim 2, further comprising:
   extracting object instances previously sent to the mobile device from the sorted object instances.

6. The method of claim 5, further comprising:
   associating a synchronization key with each of the plurality of object instances.

7. The method of claim 6, wherein the reference is the synchronization key associated with the related object instance.

8. The method of claim 2, wherein the data element of at least one of the plurality of object instances includes a reference to a related object instance.

9. The method of claim 8, wherein the reference is the key of the related object instance.

10. A computer-readable medium including instructions adapted to be executed by at least one processor to implement a method for synchronizing data between a network server and a mobile device, the method comprising:

receiving a plurality of object instances from the network server;

selecting at least one object instance from the plurality of object instances; and for each selected object instance:

recursively searching the plurality of object instances to identify related object instances, sorting the related object instances, sending the sorted object instances to the mobile device, and sending the selected object instance to the mobile device, wherein said sending the sorted object instances is performed prior to said sending the selected object instance.

11. The computer-readable medium of claim 10, wherein each of the plurality of object instances has a key and a plurality of data elements.

12. The computer-readable medium of claim 11, wherein said selecting includes filtering the plurality of object instances based on at least one data element.

13. The computer-readable medium of claim 11, wherein said sorting is based on a hierarchical relationship to the selected object instance.

14. The computer-readable medium of claim 11, wherein the method further comprises:

extracting object instances previously sent to the mobile device from the sorted object instances.

15. The computer-readable medium of claim 14, wherein the data element of at least one of the plurality of object instances includes a reference to a related object instance.

16. The computer-readable medium of claim 15, wherein the reference is the key of the related object instance.

17. The computer-readable medium of claim 14, wherein the method further comprises:

associating a synchronization key with each of the plurality of object instances.

18. The computer-readable medium of claim 17, wherein the reference is the synchronization key associated with the related object instance.

19. A system for synchronizing data between a network server and a mobile device, comprising:

a processor coupled to a network; and a memory, coupled to the processor, storing data and instructions adapted to be executed by the processor to:

receive a plurality of object instances from the network server, select at least one object instance from the plurality of object instances, and for each selected object instance:

recursively search the plurality of object instances to identify related object instances, sort the related object instances, send the sorted object instances to the mobile device, and send the selected object instance to the mobile device, wherein said sending the sorted object instances is performed prior to said sending the selected object instance.

20. The system of claim 19, wherein each of the plurality of object instances has a key and a plurality of data elements.

21. The system of claim 20, wherein said select includes filtering the plurality of object instances based on at least one data element.

22. The system of claim 20, wherein said sort is based on a hierarchical relationship to the selected object instance.

23. The system of claim 20, wherein the instructions further comprise:

extract object instances previously sent to the mobile device from the sorted object instances.

24. The system of claim 23, wherein the data element of at least one of the plurality of object instances includes a reference to a related object instance.

25. The system of claim 24, wherein the reference is the key of the related object instance.

26. The system of claim 23, wherein the instructions further comprise:

associate a synchronization key with each of the plurality of object instances.

27. The system of claim 26, wherein the reference is the synchronization key associated with the related object instance.

* * * * *